United States Patent [19]

Peretti et al.

[11] Patent Number: 4,892,268
[45] Date of Patent: Jan. 9, 1990

[54] PROPULSION, MONITORING AND CONTROL UNIT PARTICULARLY FOR BALLISTIC OBJECTS

[75] Inventors: Claudio Peretti; Guglielmo Rebuffatti, both of Lombardore Turin, Italy

[73] Assignee: A.R.I.S.S.p.A., Lombardore Turin, Italy

[21] Appl. No.: 228,973

[22] Filed: Aug. 5, 1988

[51] Int. Cl.⁴ .......................................... F42B 15/033
[52] U.S. Cl. ..................................... 244/3.1; 244/120; 102/384
[58] Field of Search ............... 102/207, 208, 293, 374, 102/382, 384; 244/3.1, 3.24, 3.27, 3.28, 3.29, 120

[56] References Cited

U.S. PATENT DOCUMENTS

| 2,423,090 | 7/1947 | Fink et al. | 102/384 |
| 2,926,611 | 3/1960 | Hinman | 102/208 |
| 3,764,091 | 10/1973 | Crowhurst | 244/3.24 |
| 4,447,025 | 5/1984 | Bock et al. | 244/3.28 |
| 4,553,718 | 11/1985 | Pinson | 244/3.1 |

Primary Examiner—Stephen C. Bentley
Attorney, Agent, or Firm—Browdy and Neimark

[57] ABSTRACT

A command control and propulsion unit for ballistic munitions, including a wind-driven propeller, attached to a front end of the body of the munition for activation of an alternator. The electric power generated by the alternator activates a pump that feeds liquid fuel to a rocket motor oxidized by a liquid oxygen coming from a tank housed in a cradle. The cradle is coupled to a saddle, radially opposite from the cradle, which is provided with hinged and foldable sings. The body of the munition is coupled between the saddle and the cradle.

6 Claims, 2 Drawing Sheets

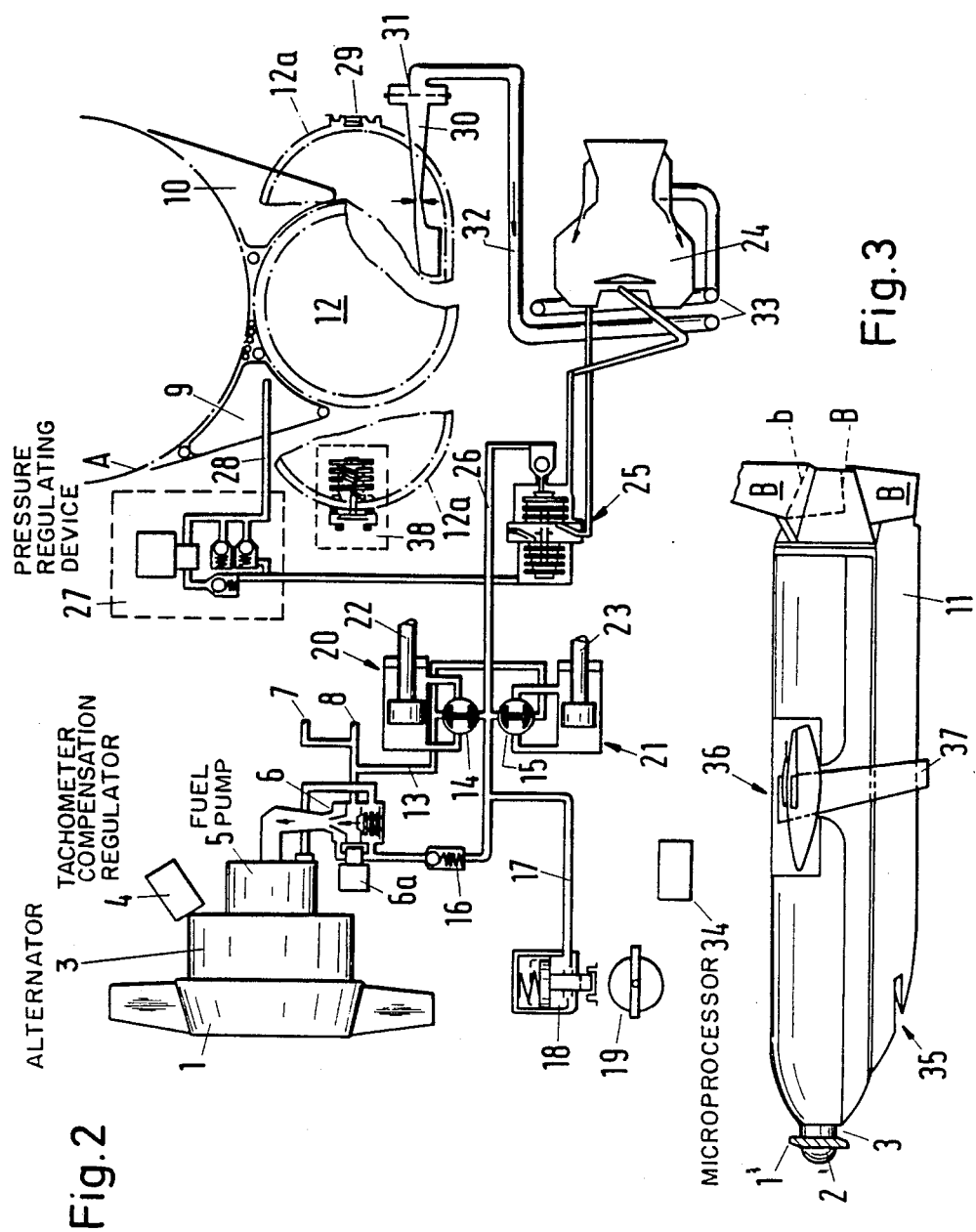

PROPULSION, MONITORING AND CONTROL UNIT PARTICULARLY FOR BALLISTIC OBJECTS

BACKGROUND OF THE INVENTION

In the ballistics field it is known to use air transportable munitions belonging to two basic categories. One category comprises munitions originally equipped with carrying and motor propulsion means (stand-off) that can be activated upon release by the carrier aircraft. The release occurs a pre-established distance from the target. Such munitions therefore have a pre-established range of flight for reaching the target. The other category comprises munitions that originally do not have means for autonomous flight and therefore must be released on the pre-established target.

SUMMARY OF THE INVENTION

Since the applicant is the owner of U.S. patent application No. 67193-A/87 of 3/13/1987 that has as its object carrying equipment that can be rapidly applied to munitions originally not having means of autonomous flight, the object of this invention is to provide a unit comprising command means, control and motor propulsion elements made particularly to be associated with the carrying equipment of said patent application. The characteristics of the equipment remain unchanged, the main one of which derives from its structure that comprises a saddle and a cradle, mounted in a diametrically opposite position with respect to the body of the munition which is locked between the saddle and cradle, able to be rapidly mounted during use.

In view of the object set forth, the unit in question includes a swiveling propulsion head with a heat reaction chamber, fed with liquid fuel, for example, kerosene, contained in a pair of tanks consisting of leakproof flexible bags housed in the cradle of the carrying equipment. The cradle is also houses a tank with a space under vacuum, controlled by a suitable valve, containing liquid oxygen which oxides and cools the ejector nozzle of the propulsion head and then protects the reaction chamber. Further, the munition in the front of its body is equipped with a wind-driven propeller that activates both an alternator—whose electric power causes the ascent of the motor and activation of a gyroscope and a computer—and a pump for feeding fuel to the motor and to the on-board hydraulic plant.

BRIEF DESCRIPTION OF THE DRAWINGS

The invention is described below with reference to the accompanying diagrammatic drawings by way of illustration, in which:

FIG. 2 is a diagram of the motor plant and of various on-board elements; and

FIG. 3, on a different scale, is a side view of the complete munition of FIG. 1, in transport attitude.

DETAILED DESCRIPTION OF THE PREFERRED EMBODIMENTS

Figure 1:
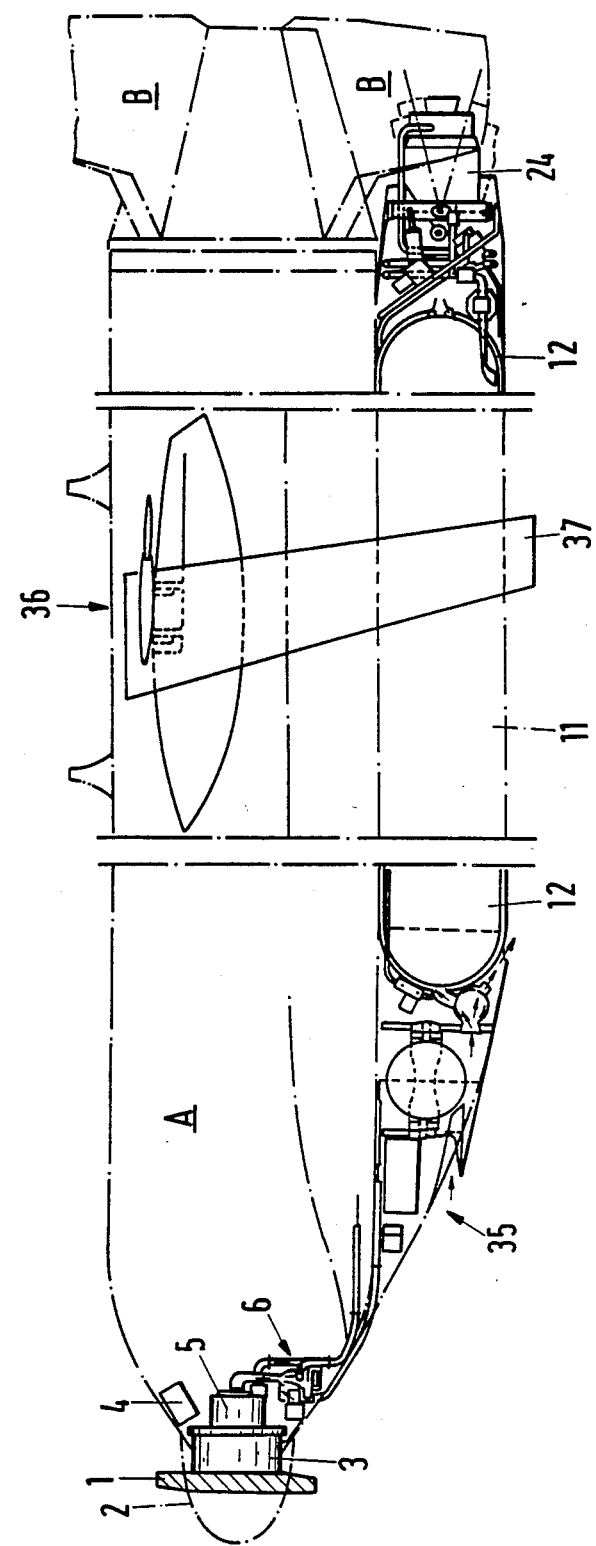
FIG. 1 is a side view, reduced in length and in partial longitudinal section, of a munition originally not having means of autonomous flight, transformed into a flying munition (stand-off), complete with the carrying equipment and the unit under discussion.

In the drawings, FIGS. 1 and 2, 1 is indicates a driving propeller mounted to rotate, together with warhead 2, which replaces the original warhead of munition A. The propeller, which can be driven in rotation by the wind, in turns puts into rotational movement an alternator 3 provided with a regulator and tachometric compensation regulator 4. A liquid fuel pump 5 is activated coaxially also by propeller 1. An ejector group 6, known in itself, is provided with a depressurization valve and a control sensor. Lines 7, 8 provide for intake of the liquid fuel, such as kerosene, from tanks 9, 10, consisting of leakproof flexible bags, housed in the side spaces existing between the inside walls of cradle 11, munition A and tank 12 containing liquid oxygen, as shown in FIGS. 1 and 3. The liquid fuel, sucked in by lines 7, 8, is conveyed to the slide valves of hydraulic actuators 14, 15; 13 indicates the fuel return line; 16 indicates a check valve by which, through line 17, hydraulic triggering device 18 of gyroscope 19 is fed. Hydraulic devices 20, 21 comprise cylinders and their related pistons, associated with electrically controlled hydraulic distribution slide valves 14, 15. Rods 22, 23 of the pistons of said hydraulic devices, by transmission elements, perform the swiveling, or horizontal rotation, of motor 24, supported by a universal joint. A valve 25 is provided for regulating the flow of liquid fuel to motor 24, brought by line 26. A device 21 for regulating the inside pressure of oxygen tank 12, as shown in FIG. 1, is connected to tank 12 by a sensor tube 28. Considering that hemispheric caps 12a, drawn in dot-dash lines in FIG. 2, diagrammatically represent the opposite ends of fuel tank 12, seen in longitudinal section, A valve 38 is provided to eliminate the vacuum in the space of tank wall 12 when it has to be pressurized for feeding the motor.

During transport in the space of tank 12, the vacuum is maintained to limit the evaporation of the liquid oxygen; during on-site functioning, air is introduced in place of the vacuum, at ambient temperature. A calibrated safety valve included in the device 27 for discharge of oxygen when the inside pressure of tank 12 exceeds a pre-established value. A Venturi tube 30 penetrates into back end 12a of tank 12 for delivery of liquid oxygen which, through a cutoff valve 31, provided with a perforable diaphragm at pre-established pressure and through line 32 and spiraled section 33 of the line, reaches the combustion chamber of motor 24, only when said diaphragm of valve 31 has been perforated by the pressure of the oxygen itself. Section 33 of the line is spiraled and realizes a spring connected to motor 24 which reacts elastically to the swiveling movements of the motor. An on-board microprocessor 34 is also shown.

The use and operation of the unit are described below.

The munition is originally provided with directional tail unit B, which is hinged at b, folded during transport and opened, by elastic means, during release, and is attached to the unit and carrying equipment. The carrying equipment comprises the saddle 36, with drawn-in wings 37, and the cradle 11, coupled to saddle 36, as shown in FIGS. 1 and 3. A front air intake 35 is provided an cradle 11. The munition is hooked to the carrier aircraft, which after having established the altitude, direction and distance with respect to the target, releases munition A.

Propeller 1, activated by the wind, operates alternator 3, pump 5 and the ejector group 6.

All the hydraulic elements, through pump 5, are fed liquid fuel, as a fluid means, which also feeds motor 24, and therefore the unit has a pre-established period of operating and autonomy of flight, determined by the amount of fuel introduced into tanks 9, 10 and the amount of liquid oxygen introduced into tank 12.

The carrier aircraft which transports the unit provides the unit—at the beginning of the release sequence (arming)—with the direction and altitude while a series of parameters relating to its functional characteristics are known because they are pre-established, such as: distance from the target for the release; velocity and length of time of autonomous flight of the unit which, before being released, is triggered, for example, by the command of the microprocessor which computes the distance by counting the rotations of the wind-driven propeller.

Propeller 1 is triggered by an electric signal, deactivating a mechanical stop which, coaxially drives alternator 3 and pump 5 which, in turn, by lines 7, 8, takes the fuel from tanks 9 and 10, and feeds actuators 14, 15 and valve 25 inserted on the line that brings the fuel to motor 24. Alternator 3 feeds into microprocessor 34 which controls valve 6a, causes its opening and provides the ignition pulse of motor 24. Gyroscope 19, triggered by hydraulic pressure, goes into operation and, through microprocessor 34, acts on the electrically controlled slide valves of hydraulic actuators 20, 21 which react to pitching and possible bankings of the unit in flight, when it has been released. This nay cause motor 24 to be misaligned, which motor, with its jet corrects, by reaction, the flight of the unit. Spiraled part 33 of the motor feed line, assisted by the reaction of hydraulic actuators 14, 15, brings the motor and its jet back to the correct and pre-established course. The liquid oxygen contained in tank 12 (12a), after overcoming the blockage of diaphragmed valve 31, through line 32, provides for cooling of the ejector nozzle and, then, cooling of the combustion chamber of motor 24. The air which, by aerodynamic effect, penetrates into front mouth or air intake 35, by a space provided between the shell of tanks 12 and its housing, provides for warming of the tank and the contained liquid oxygen, by pressurizing it. The flight of the unit lasts until the pre-established target is reached on which A is released.

One of the characteristics of the unit described derives from the absence of avionic interface between the aircraft and the munition.

Other characteristics reside in the fact that, following the launching, direction and altitude of flight, which initially were provided by the carrier, are preserved by the automatic functioning of the on-board systems, comprising a gyroscope, variometer and swiveling motor.

Another but not final characteristic derives from the inexpensiveness of the unit and its versatility particularly in relation to the possibilities of the known technology in the specific field.

We claim:

1. A command, control and propulsion unit applicable to ballistic objects, to give them the capability of autonomous flight for a pre-established period, following launching from a carrier aircraft, the munitions having a body, and the unit comprising:
   substantially bivalve air carrying equipment consisting of a winged saddle mounted to straddle the body of the munition, and a cradle mounted in radial opposite position to the saddle and with respect to the body which is locked between the saddle and the cradle;
   removable means for mutual coupling of the saddle, cradle, and the body;
   an alternator;
   a pump;
   a wind-drive propeller for operating said alternator and said pump;
   a warhead integral with said wind-drive propeller;
   an electric plant contained in the cradle fed by electric power generated by the alternator;
   a first tank disposed in the cradle having a pressurizable vacuum space for carrying liquid oxygen;
   second tanks for carrying liquid fuel;
   a rocket motor for controlling flight of the munition; and
   a plurality of devices for control and command of the motor.

2. The command and control unit according to claim 1, further comprising electrohydraulic slide valves associated with hydraulic actuators having swiveling elements for allowing the motor to swivel; and a liquid oxygen feed line, provided with a terminal Venturi tube, immersed in the first tank of the liquid oxygen for feeding the liquid oxygen to the motor.

3. A unit according to claim 2, wherein the feed line for feeding liquid oxygen to the rocket motor ends in a spiraled section adapted to react elastically to the swiveling movements of the motor.

4. A unit according to claim 2, wherein the liquid fuel also acts as a fluid element for feeding the hydraulic elements.

5. A unit according to claim 1, further comprising an electronic processor which processes a plurality of data and sends suitable signals to correct possible anomalies during the autonomous flight of the munition.

6. A unit according to claim 1, further comprising means for pressurizing the liquid oxygen tank by allowing air to flow into the vacuum space in the liquid oxygen tank.

* * * * *